(12) United States Patent
Honda (10) Patent No.: US 7,900,957 B2
(45) Date of Patent: Mar. 8, 2011

(54) AIRBAG APPARATUS

(75) Inventor: Kensaku Honda, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 125 days.

(21) Appl. No.: 12/385,900

(22) Filed: Apr. 23, 2009

(65) Prior Publication Data

US 2009/0283991 A1 Nov. 19, 2009

(30) Foreign Application Priority Data

May 13, 2008 (JP) ................................. 2008-126097

(51) Int. Cl.
*B60R 21/233* (2006.01)
*B60R 21/239* (2006.01)

(52) U.S. Cl. ....................... 280/729; 280/739; 280/730.2

(58) Field of Classification Search .................. 280/739, 280/743.1, 730.2, 729; *B60R 21/233, 21/239*
See application file for complete search history.

(56) References Cited

U.S. PATENT DOCUMENTS

| 5,454,595 | A | * | 10/1995 | Olson et al. | 280/743.1 |
| 5,560,649 | A | * | 10/1996 | Saderholm et al. | 280/743.1 |
| 6,213,499 | B1 | * | 4/2001 | Khoudari et al. | 280/730.2 |
| 6,398,258 | B2 | * | 6/2002 | Hamada et al. | 280/743.1 |
| 7,147,248 | B2 | * | 12/2006 | Lee | 280/740 |
| 7,210,702 | B2 | * | 5/2007 | Soderquist | 280/740 |
| 2008/0296875 | A1 | * | 12/2008 | Aho et al. | 280/729 |
| 2009/0020987 | A1 | * | 1/2009 | Wipasuramonton et al. | 280/729 |
| 2009/0212539 | A1 | * | 8/2009 | Honda et al. | 280/729 |

FOREIGN PATENT DOCUMENTS

| JP | A-2004-243976 | 9/2004 |
| JP | A-2006-8017 | 1/2006 |
| JP | A-2008-7104 | 1/2008 |

* cited by examiner

*Primary Examiner* — Ruth Ilan
(74) *Attorney, Agent, or Firm* — Posz Law Group, PLC

(57) ABSTRACT

A side airbag apparatus includes an airbag 30 and an inflator assembly 20 incorporated in the airbag 30. The airbag 30 is formed by first and second inflation sections 31, 42. An insertion portion 49 in an upper portion of the second inflation section 42 is located in a lower portion of a receptacle portion 38 of the first inflation section 31. The gas discharge passages 57 for discharging inflation gas G in the first inflation section 31 to the outside of the airbag 30 are formed between the overlapped insertion portion 49 and receptacle portion 38. In this state, the first and second inflation sections 31, 42 are connected to each other. When the first inflation section 31 is not restraining the occupant, the inflation gas G in each inflation section 31, 42 causes the insertion portion 49 to closely contact the receptacle portion 38, so that the gas discharge passages 57 are closed. When the first inflation section 31 is restraining the occupant P, a part of the insertion portion 49 is separated from the receptacle portion 38 by using the increase in the internal pressure of the first inflation section 31 due to the restraint, so that the gas discharge passages 57 are opened.

7 Claims, 10 Drawing Sheets

Vehicle Outside ←          → Vehicle Inside

Vehicle Outside ←  → Vehicle Inside

AIRBAG APPARATUS

BACKGROUND OF THE INVENTION

The present invention relates to an airbag apparatus that inflates an airbag to protect an occupant when an impact is applied to a vehicle.

A side airbag apparatus having an inflator and an airbag is effective as an apparatus that protect an occupant when an impact is applied to a vehicle from a side due to a side collision. In such a side airbag apparatus, when an impact is applied from the side of a body side portion of the vehicle, the inflator discharges inflation gas into the airbag. The discharged inflation gas inflates and deploys the airbag forward from the backrest into a narrow space between the occupant seated in the vehicle seat and the body side portion. This reduces the impact that is transmitted from the side to the occupant through the body side portion.

The impact resistance of the sides of the human body varies from part to part. For example, the lumbar region has a better impact resistance than the thorax. In the case of a side airbag apparatus that protects an occupant in an area ranging from the lumbar region to the thorax, it is preferable that an inflated and deployed airbag protect a region of a lower impact resistance (the thorax) more gently than a region of a higher impact resistance (lumber region).

Japanese Laid-Open Patent Publication Nos. 2004-243976, 2006-8017, and 2008-7104 each disclose an airbag apparatus that is designed with the above described impact resistance of the human body. In each of the airbag apparatus disclosed in these publications, the interior of the airbag is divided into a plurality of inflation sections (chambers) by partitioning means such as seams and tethers. By varying the flow rate of inflation gas supplied from the inflator to each inflation section, the internal pressure of each inflation section has a value suitable for the impact resistance of the corresponding part of the side of the occupant's body. Further, a vent hole is formed in an inflation section of the airbag that protects a low impact resistance region of the occupant (for example, the thorax). Some of the inflation gas in the inflation section is discharged to the outside through the vent hole, so that the internal pressure of the inflation section is adjusted so as to be prevented from being excessively raised. Therefore, when the inflation section of which the internal pressure has been raised by inflation receives pressing force by the occupant due to restraint, some of the inflation gas is discharged through the vent hole. This inhibits the further increase of the internal pressure of the inflation section, so that a low impact resistance region of the occupant (for example, the thorax) is protected by the inflation section having an appropriate hardness.

However, in the airbag apparatuses of the above publications, the vent hole is always open in the inflation section. Thus, inflation gas starts being discharged through the vent hole at a relatively early stage after the start of inflation and deployment of the inflation section. The primary objective of the vent hole is to discharge excessive inflation gas to the outside of the airbag that would otherwise excessively increase the internal pressure of the inflation section. That is, the vent hole is provided for discharging inflation gas when the internal pressure of the inflation section is likely to further increase on the assumption that the internal pressure of the inflation section has already been increased to a relatively high level. However, in the above described structure in which the vent hole is always open, part of the inflation gas starts being discharged through the vent hole without being used for inflation and deployment before the internal pressure of the inflation section becomes sufficiently high. As a result, although each of the airbag apparatuses according to the above publications is capable of inhibiting excessive increase of the internal pressure of the inflation section, it takes relatively long time for the inflation section to be inflated and deployed since the inflation gas starts being discharged at a relatively early stage. Also, to achieve the required performance (quick inflation of the airbag and prevention of excessive internal pressure of the inflation section), this configuration requires additional amount of inflation gas that is not effectively utilized for restraining the occupant. As described above, the above described conventional airbag apparatuses still have room for improvement in the deployment performance of the airbag and the protection performance.

SUMMARY OF THE INVENTION

Accordingly, it is an objective of the present invention to provide an airbag apparatus that inflates an inflation section at an early stage while maintaining the function for inhibiting the internal pressure of the inflation section from increasing excessively.

To achieve the foregoing objective and in accordance with one aspect of the present invention, an airbag apparatus including an inflator and an airbag is provided. The inflator discharges inflation gas in response to impact applied to a vehicle. The airbag is inflated by the inflation gas supplied by the inflator to restrain an occupant, thereby protecting the occupant. The airbag includes a first inflation section and a second inflation section that are each formed like a bag and inflated by the inflation gas from the inflator. The first inflation section has a receptacle portion, and the second inflation section has an insertion portion that is arranged in the receptacle portion in an overlapping manner.

The first inflation section and the second inflation section are connected to each other in a state where a gas discharge passage is formed between the overlapping insertion portion and receptacle portion. The gas discharge passage is used for discharging the inflation gas in the first inflation section to the outside of the airbag, and a part of the insertion portion separates from the receptacle portion so that the gas discharge passage is opened.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A vehicle side airbag apparatus according to one embodiment of the present invention will now be described with reference to the drawings. The traveling direction (advancing direction) of a vehicle is defined as the front of the vehicle in the following explanations.

Figure 1:
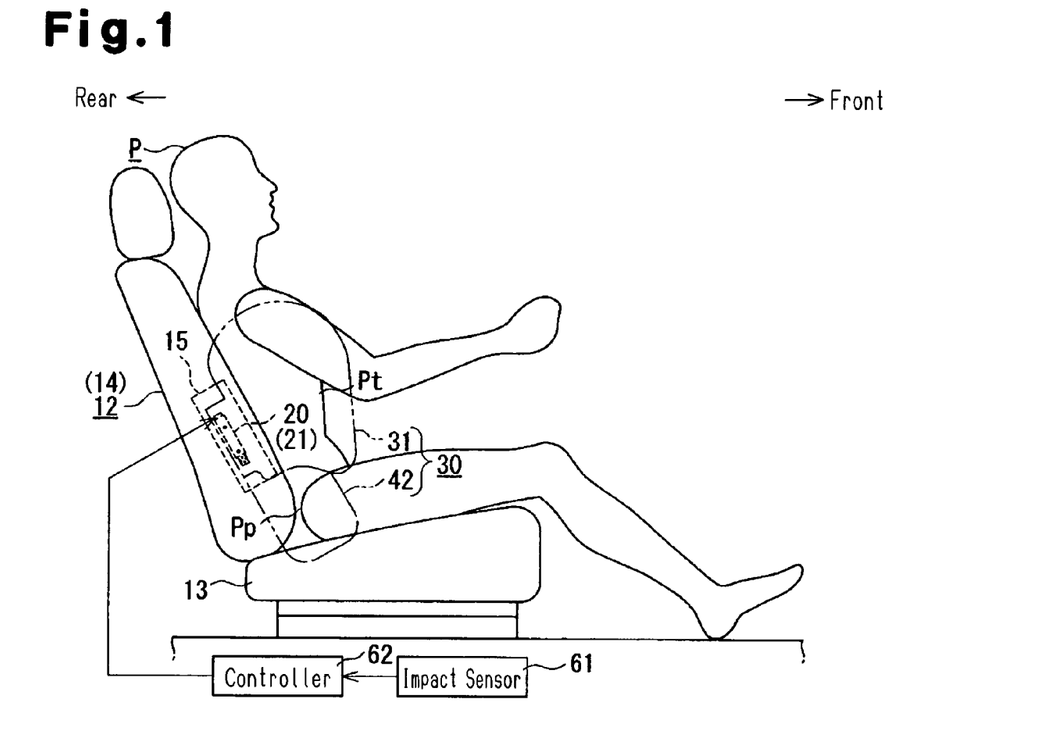
FIG. 1 is a side view illustrating a vehicle seat to which a side airbag apparatus according to one embodiment of the present invention is mounted.
Figure 2:
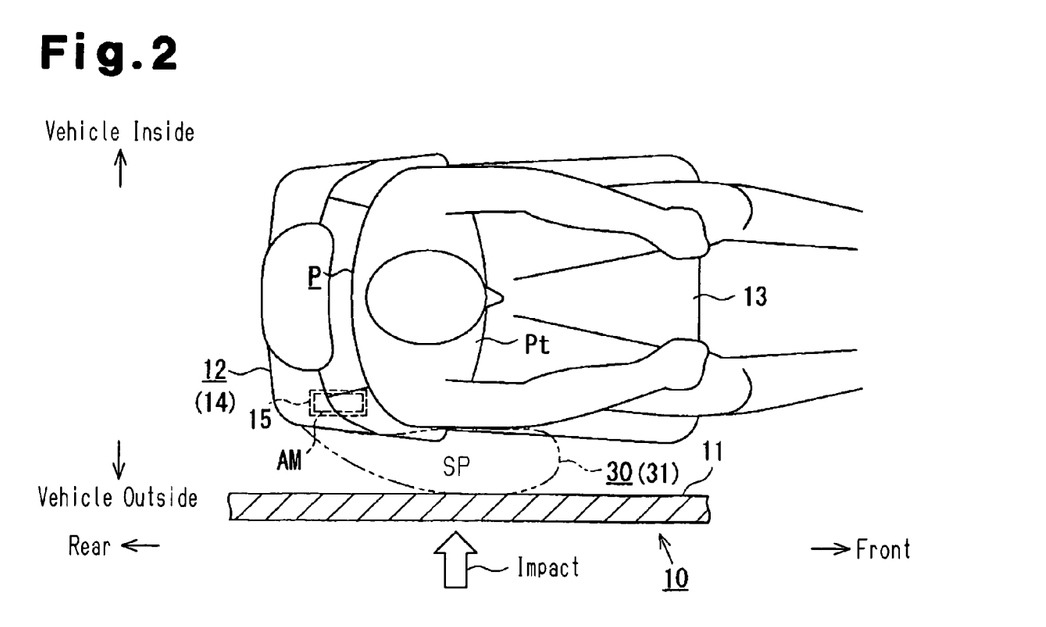
FIG. 2 is a plan view showing the arrangement of the airbag apparatus, the vehicle seat, the occupant, and the body side portion shown in FIG. 1.
Figure 3:
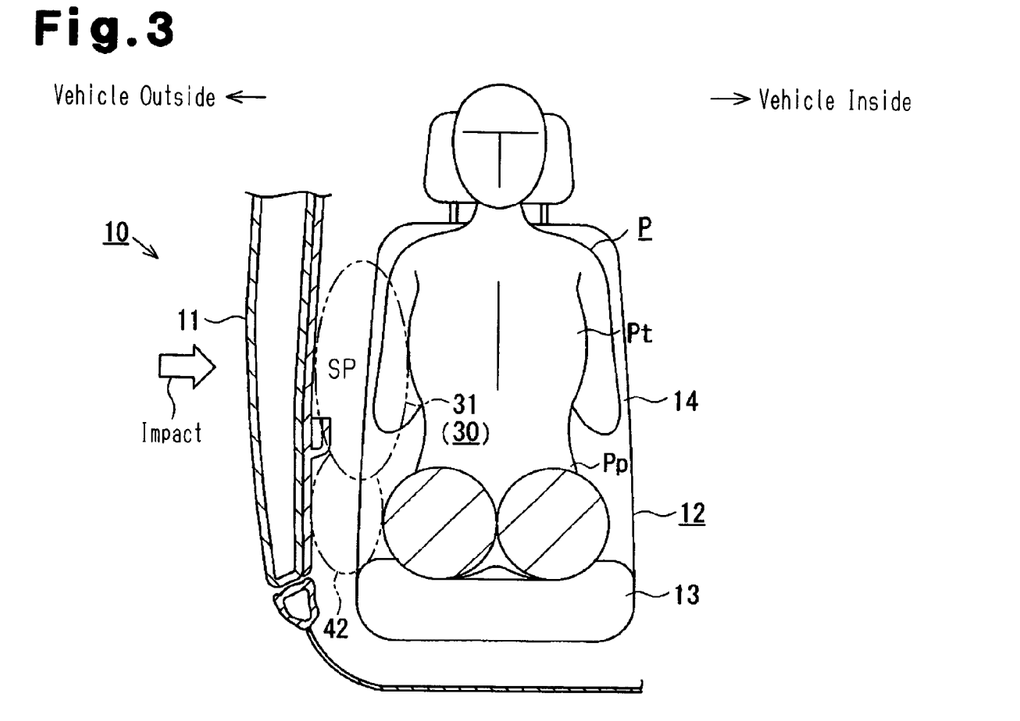
FIG. 3 is a cross-sectional front view showing the arrangement of the airbag apparatus, the vehicle seat, the occupant, and the body side portion shown in FIG. 1.

As shown in FIGS. 1 to 3, a vehicle seat 12 is arranged in a vehicle 10, and the seat 12 is located in the vicinity of a body side portion 11. The body side portion 11 refers to members that are located on a side of the vehicle. For example, part of the body side portion 11 corresponding to the front seat includes a front door and a center pillar (B-pillar). Part of the body side portion 11 corresponding to the rear seat includes a rear part of the side door (rear door), a C-pillar, a front part of the wheel well, and a rear quarter.

The seat 12 includes a seat cushion (seat portion) 13 and a seat back 14. The seat back 14 extends upward from the rear end of the seat cushion 13 and includes a tilt adjusting mechanism (not shown). A storage portion 15 is provided in a side of the seat back 14 that is located closer to the vehicle exterior. An airbag module AM, which is a main part of the side airbag apparatus, is stored in the storage portion 15. The storage portion 15 is located in the vicinity of an outer side of an occupant P seated on the vehicle seat 12. The airbag module AM includes as its main components an inflator assembly 20 and an airbag 30.

The components of the airbag module AM will now be described. In the present embodiment, the up-down direction and the front-rear direction of the components of the airbag module AM are defined with reference to the seat back 14 of the seat 12. The up-down direction refers to the direction along which the seat back 14 stands, and the front-rear direction refers to a direction that extends along the front-rear direction of the vehicle and substantially perpendicular to the up-down direction. Since the seat back 14 is inclined rearward in use, the up-down direction is not strictly the vertical direction, but is slightly inclined. Likewise, the front-rear direction is not strictly a horizontal direction, but is slightly inclined.

<Inflator Assembly 20>

Figure 4:
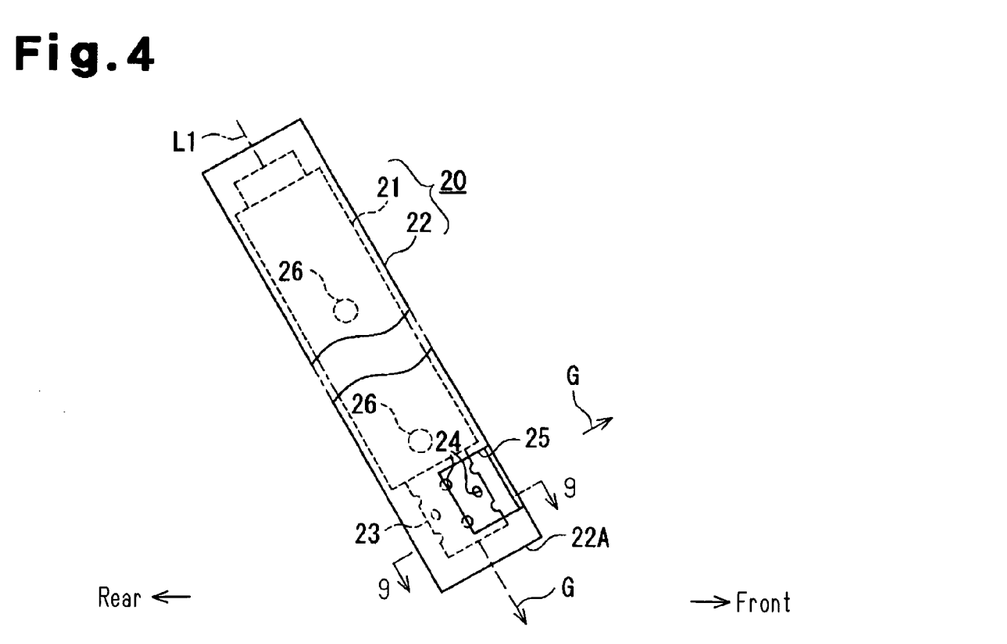
FIG. 4 is a diagrammatic side view with a part omitted, showing an inflator assembly used in the side airbag apparatus shown in FIG. 1.
Figure 5:
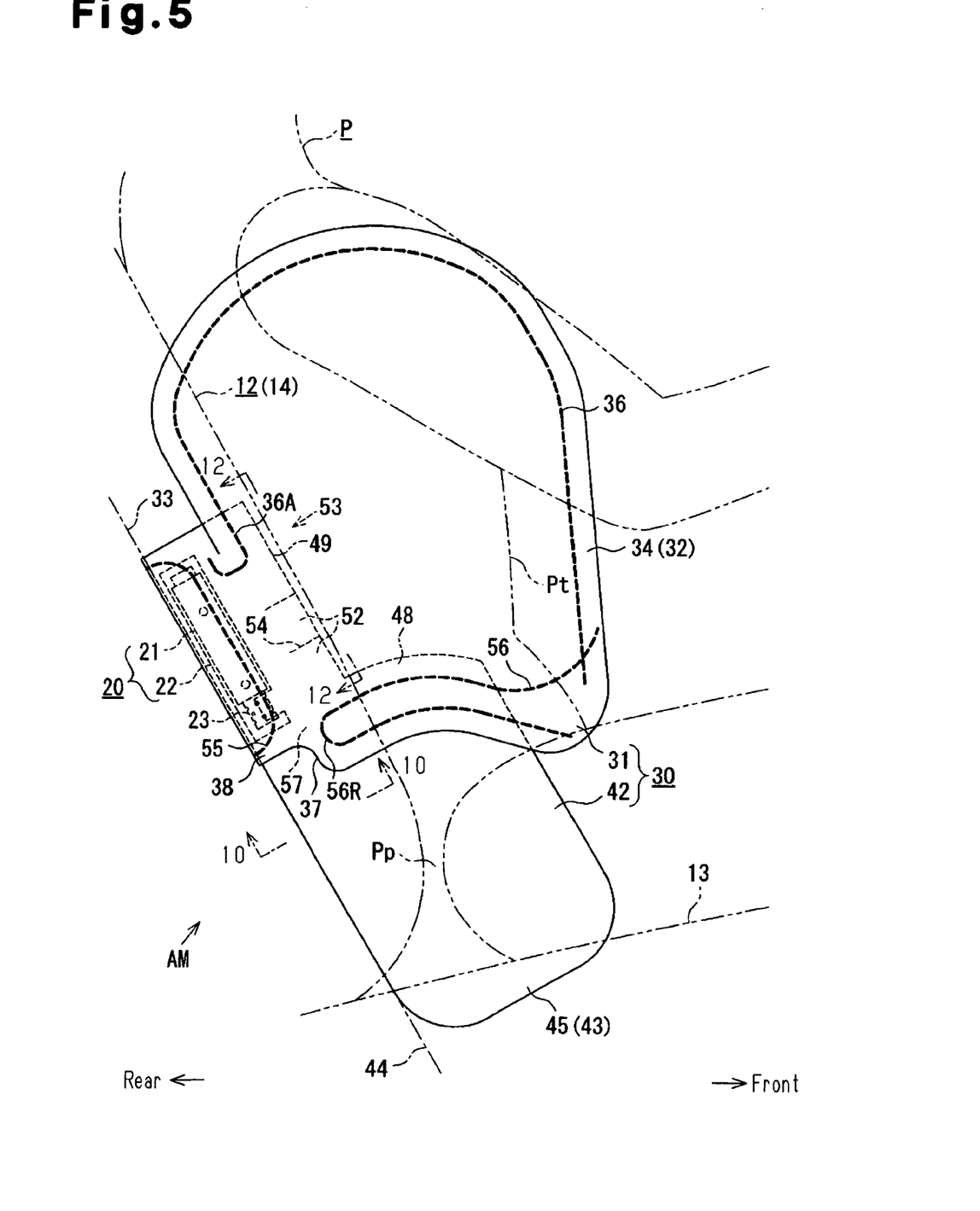
FIG. 5 is a side view illustrating an airbag module and an occupant in a state where the airbag is deployed.

FIG. 5 illustrates the airbag module AM and an occupant P as viewed from the outside of the vehicle, with the airbag 30 being fully deployed. FIG. 4 illustrates an inflator assembly 20 shown in FIG. 5. As shown in FIGS. 4 and 5, the inflator assembly 20 includes a gas generator, which is an inflator 21, and a retainer 22 that surrounds the inflator 21 from outside. The inflator 21 is substantially formed like a thin cylinder extending substantially in the up-down direction. The inflator 21 contains in it gas generating agent (not shown), which generates inflation gas G in response to an actuation signal from the outside.

A harness (not shown), which is wired for applying control signals to the inflator 21, is connected to an upper portion of the inflator 21. A substantially cylindrical gas nozzle 23 is provided at a lower end of the inflator 21. The gas nozzle 23 has a smaller outer diameter than the rest of the inflator 21. A plurality of gas ports 24 are formed in the outer circumferential surface of the gas nozzle 23. The gas ports 24 discharge the inflation gas G generated by the gas generating agent along directions (radial directions) perpendicular to the axis L1 of the inflator 21.

In place of the type using the gas generating agent as shown above, it is possible to use a different type of inflator as the inflator 21. For example, the inflator 21 may be an inflator that discharges inflation gas G by breaking a partition of a high-pressure gas cylinder by explosive and the like.

Figure 9:
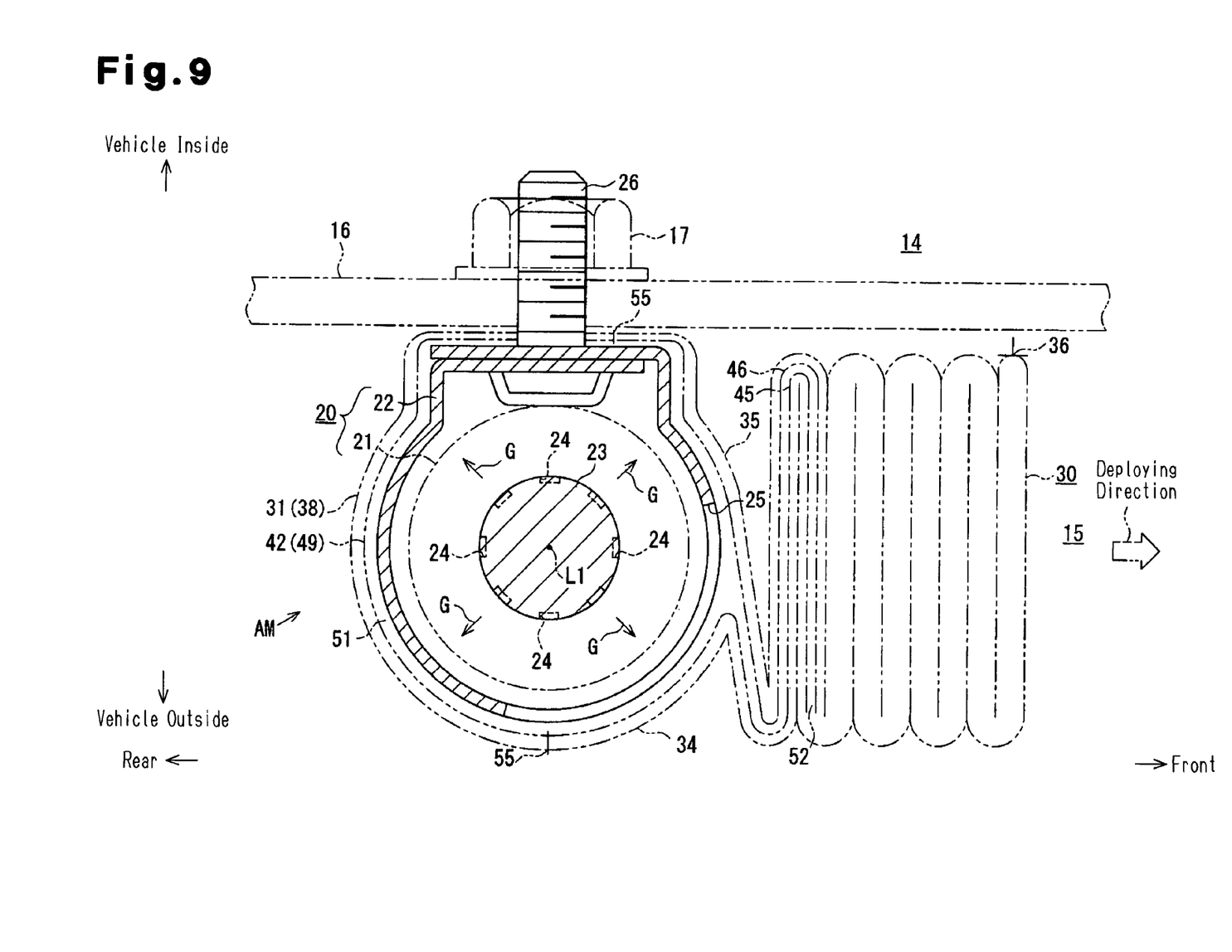
FIG. 9 is a cross-sectional view taken along line 9-9 of FIG. 4, illustrating the structure of an inflator assembly together with the seat frame and the airbag.
Figure 10:
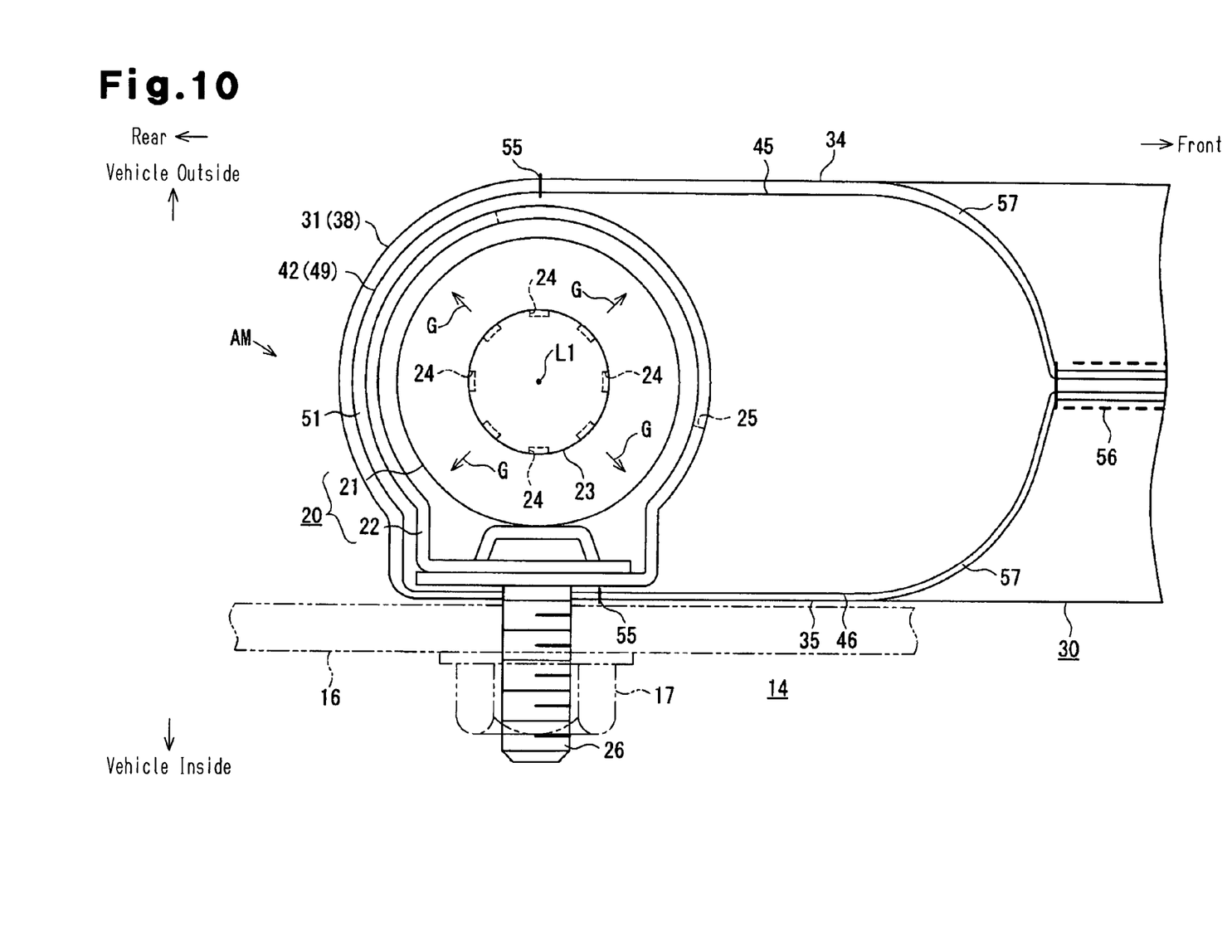
FIG. 10 is a cross-sectional view taken along line 10-10 of FIG. 5, illustrating the structure of the airbag module in a state where the first inflation section is not restraining the occupant.
Figure 11:
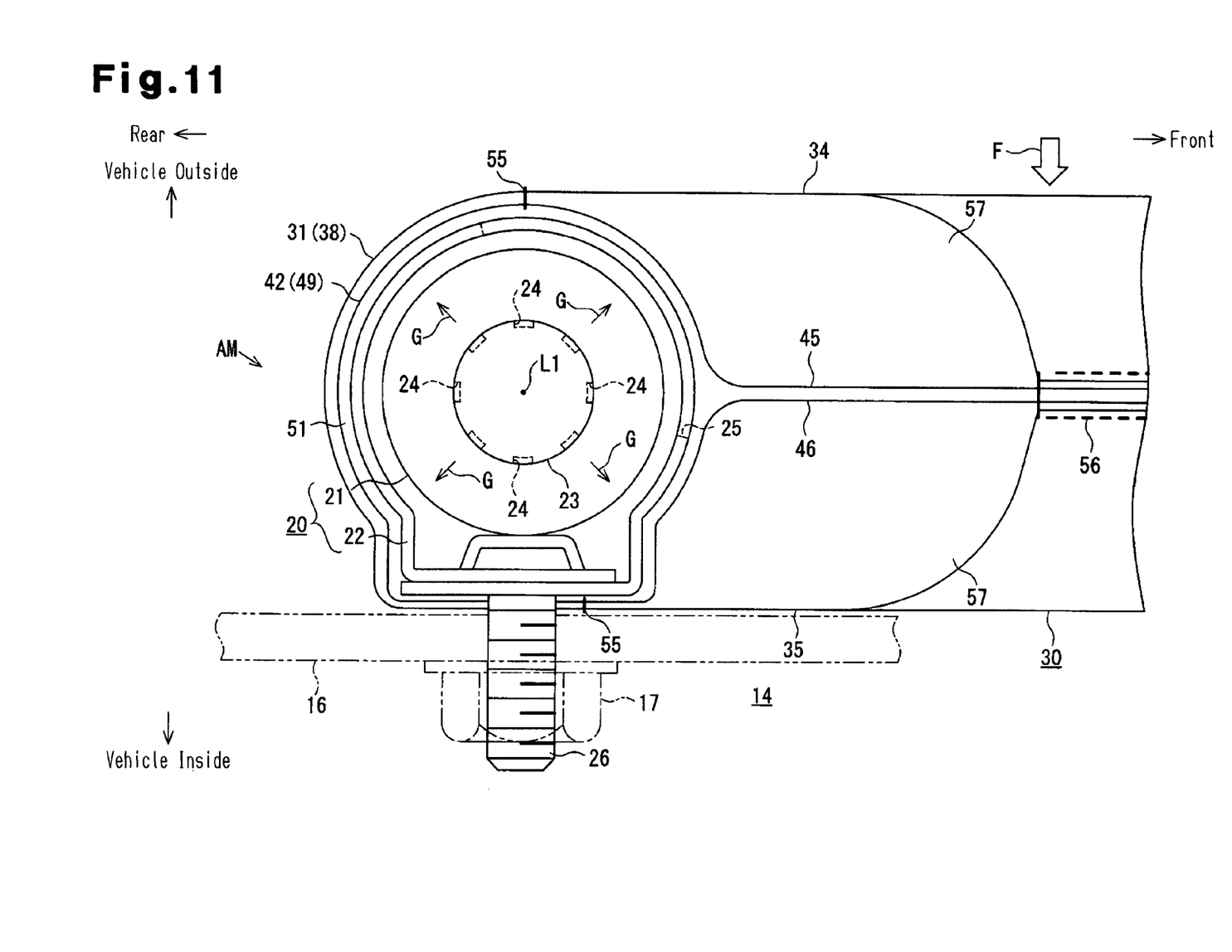
FIG. 11 is a cross-sectional view illustrating the structure of the airbag module when the first inflation section restrains an occupant from the state shown in FIG. 10.

On the other hand, the retainer 22 functions as a diffuser and secures the inflator assembly 20 to a seat frame 16 in the seat 12 together with the airbag 30 (see FIGS. 9 to 11). The retainer 22 is substantially formed like a thin cylinder extending substantially in the up-down direction. The retainer 22 is formed by bending a metal plate. The retainer 22 has an open end 22A at least at the lower end. The open end 22A allows part of the inflation gas G discharged from the gas nozzle 23 to flow substantially downward.

The retainer 22 has an opening 25 at a portion above the open end 22A and forward of the gas nozzle 23 of the inflator 21. The opening 25 allows part of the inflation gas G discharged from the gas nozzle 23 to flow substantially forward.

The retainer 22 is fixed to the seat frame 16 with securing members, which are a plurality of bolts 26. In other words, the bolts 26 are indirectly fixed to the inflator 21 by means of the retainer 22.

<Airbag 30>

As shown in FIGS. 1 to 3, when an impact is applied to the body side portion 11 of the vehicle 10 when the vehicle 10 is moving, the airbag 30 is inflated and deployed by the inflation gas G from the inflator 21. The airbag 30 pops out from the storage portion 15 with a rear part thereof (including an inflator accommodating portion 51 discussed below) in the storage portion 15. Thereafter, the airbag 30 is inflated and deployed in a narrow space SP between the seat 12 and the body side portion 11 to restrain the occupant P, thereby protecting the occupant P from the impact. When the airbag 30 is inflated and deployed, the forward direction of the vehicle 10 is defined as a forward direction of the deployment.

As shown in FIGS. 3 and 5, the airbag 30 has a first inflation section 31 and a second inflation section 42, which are each formed like a bag. The second inflation section 42 is inflated and deployed by a relatively high internal pressure primarily in the vicinity of a position at the outside of the lumbar region Pp of the occupant P, thereby restraining and protecting the lumbar region Pp. The first inflation section 31 is inflated and deployed by an internal pressure lower than that of the second inflation section 42 primarily in the vicinity of a position at the outside of the thorax Pt of the occupant P, thereby protecting the thorax Pt. Most of the first inflation section 31 is located at a position above the second inflation section 42.

Referring to FIGS. 5 to 8, the first inflation section 31 and the second inflation section 42 will be described in the following order: (i) an isolated configuration of the second inflation section 42; (ii) an isolated configuration of the first inflation section 31; and (iii) a combined state of the first and second inflation sections 31, 42.

Figure 6:
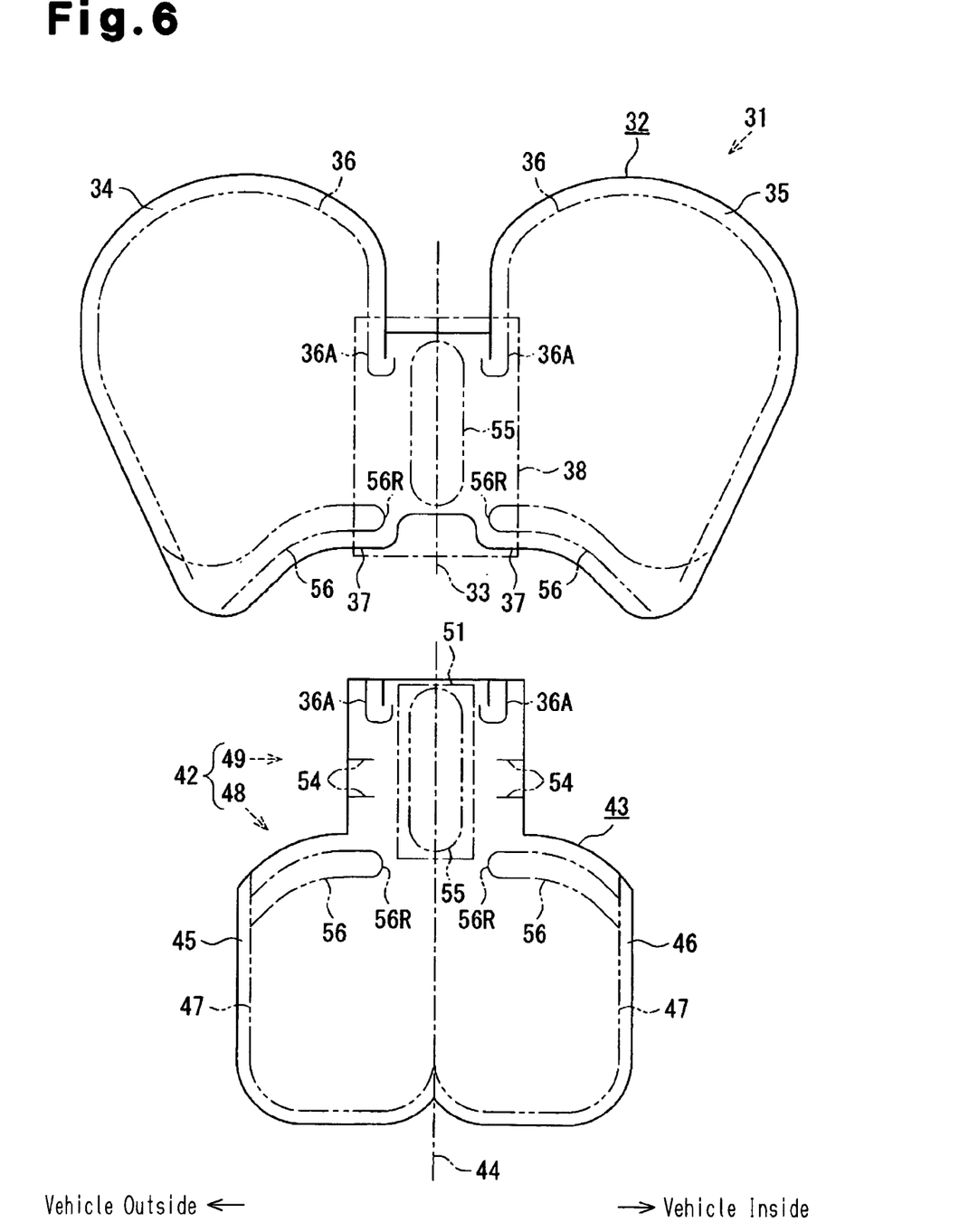
FIG. 6 is a plan view illustrating a first inflation section and a second inflation section in a flatly spread state.
Figure 7:
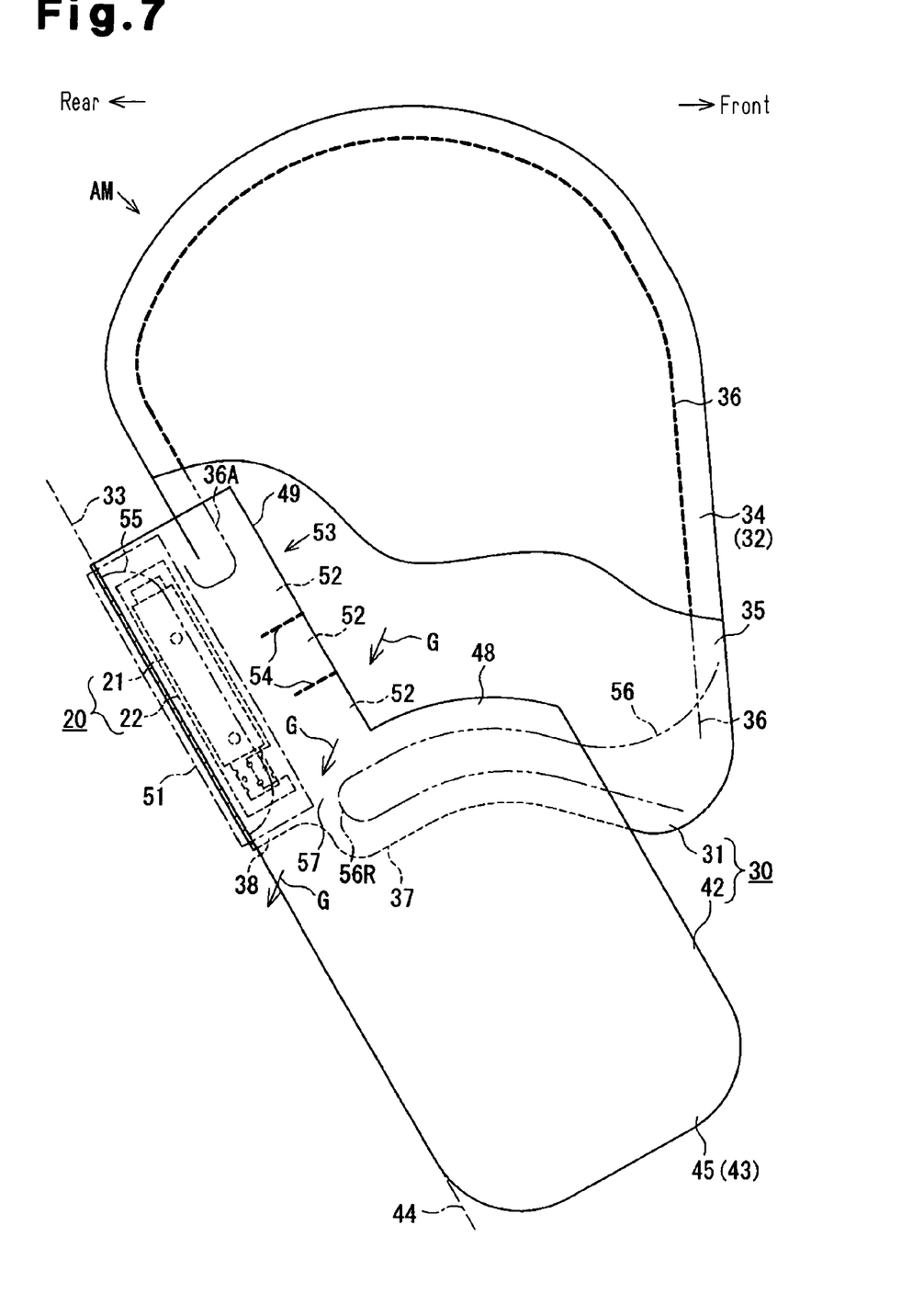
FIG. 7 is a side view, with a part cut away, illustrating a first fabric portion of a first inflation section in FIG. 5.
Figure 8:
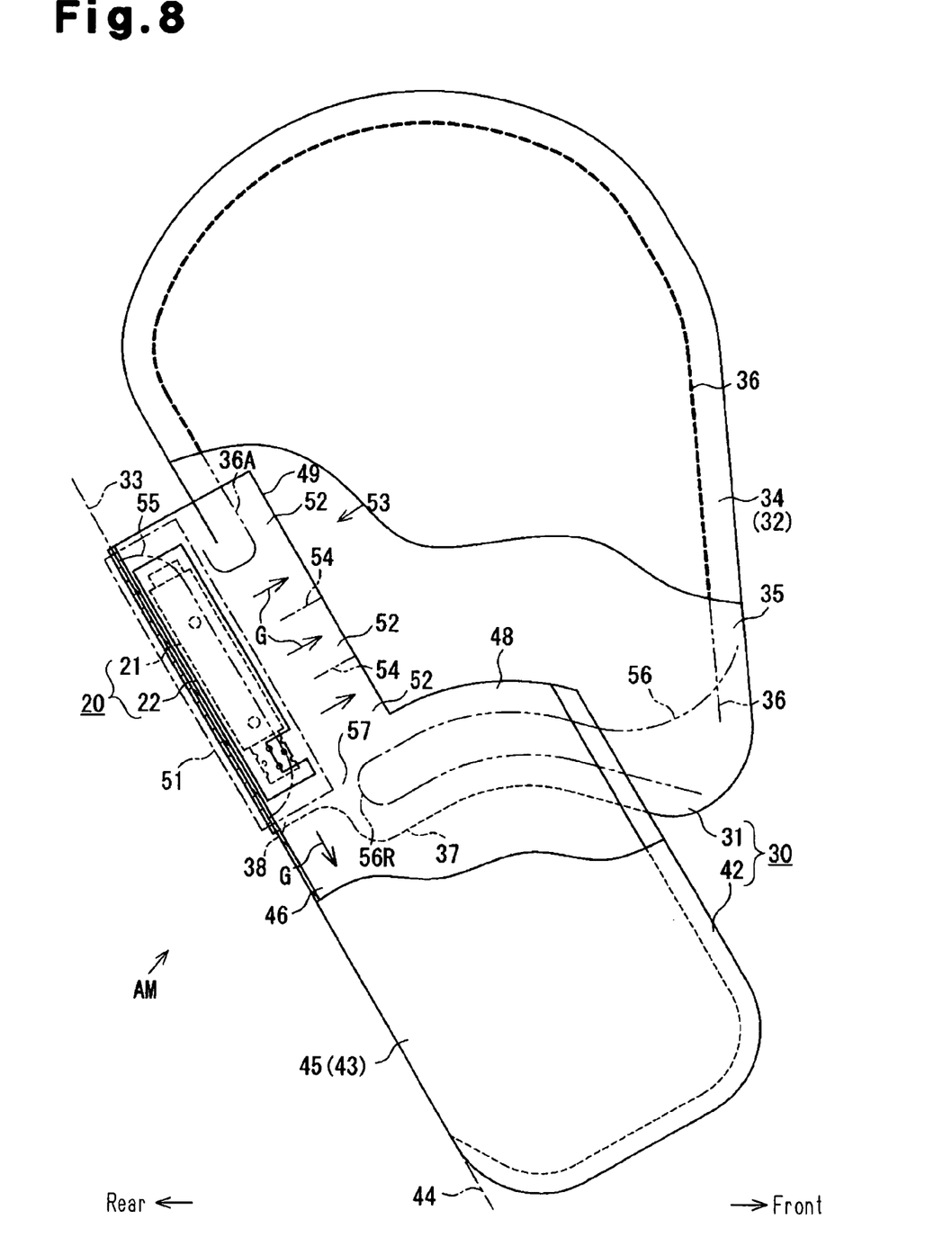
FIG. 8 is a side view, with a part cut away, illustrating a third fabric portion of a second inflation section in FIG. 7.

FIG. 6 illustrates the first inflation section 31 and the second inflation section 42 in a flatly spread state. FIGS. 7 and 8 show the internal structure of the airbag 30. FIG. 7 shows a state in which a part is cut away from a first fabric portion 34 of the first inflation section 31 shown in FIG. 5. FIG. 8 shows a state in which a part is cut away from a third fabric portion 45 of the second inflation section 42 shown in FIG. 7.

(i) Configuration of Second Inflation Section 42

The second inflation section 42 is formed of a single fabric sheet (also referred to as a fabric panel) 43. As the material for the fabric sheet 43, a material that has a high strength and flexibility and is easy to fold is preferable.

For example, woven fabric made of polyester threads or polyamide threads is suitable. The fabric sheet 43 is folded in half in the widthwise direction of the vehicle along a folding line 44 defined in a center portion. The folded two portions (hereinafter, referred to as third and fourth fabric portions 45, 46) are coupled to each other by a peripheral joining portion 47 provided at a peripheral portion except for the upper portions of the third and fourth fabric portions 45, 46. The peripheral joining portion 47 is formed by sewing the third and fourth fabric portions 45, 46 at the peripheries with sewing threads. The peripheral joining portion 47 may be formed by a method other than sewing using sewing thread as shown above, but may be formed by, for example, using an adhesive. This also applies to peripheral joining portions 36, joining portions 54, inner joining portions 55, and partition joining portions 56, which are discussed below.

The sewn third and fourth fabric portions 45, 46 are turned inside out to form the second inflation section 42. After the third and fourth fabric portions 45, 46 are joined to each other by the peripheral joining portion 47, the third and fourth fabric portions 45, 46 are turned inside out to form the second inflation section 42. The second inflation section 42, which is formed through turning the bag inside out, is generally called a reversed type. Due to the reversing described above, edges of the third and fourth fabric portions 45, 46 located outside of the peripheral joining portions 47 are located inside the second inflation section 42. The edges outside of the peripheral joining portions 47 are seam allowance.

In a lower portion of the second inflation section 42, a part surrounded by the peripheral joining portion 47 forms an inflation body 48 that is inflated to restrain the lumbar region Pp of the occupant P. In an upper portion of the second inflation section 42, a part where the peripheral joining portion 47 is not provided forms an insertion portion 49. In the insertion portion 49, a part close to the folding line 44 forms an inflator accommodating portion 51 for accommodating the inflator assembly 20 described above (see FIGS. 7 and 8).

The second inflation section 42 may be formed in a manner different from that shown above. For example, two separate fabric sheets may be stacked and the peripheral portions of the fabric sheets may be sewn together to form a bag shaped second inflation section 42. The first inflation section 31 and the second inflation section 42, which will be discussed below, each may be formed by two separate fabric sheets.

Further, the second inflation section 42 may be a non-reversed type in which the third and fourth fabric portions 45, 46 are not turned inside out after the third and fourth fabric portions 45, 46 are joined to each other at the peripheral joining portion 47. In the non-reversed type, edges of the third and fourth fabric portions 45, 46 located outside of the peripheral joining portions 47 are located outside the second inflation section 42 and exposed. The portions outside of the peripheral joining portions 47 are seam allowance.

Figure 12A:
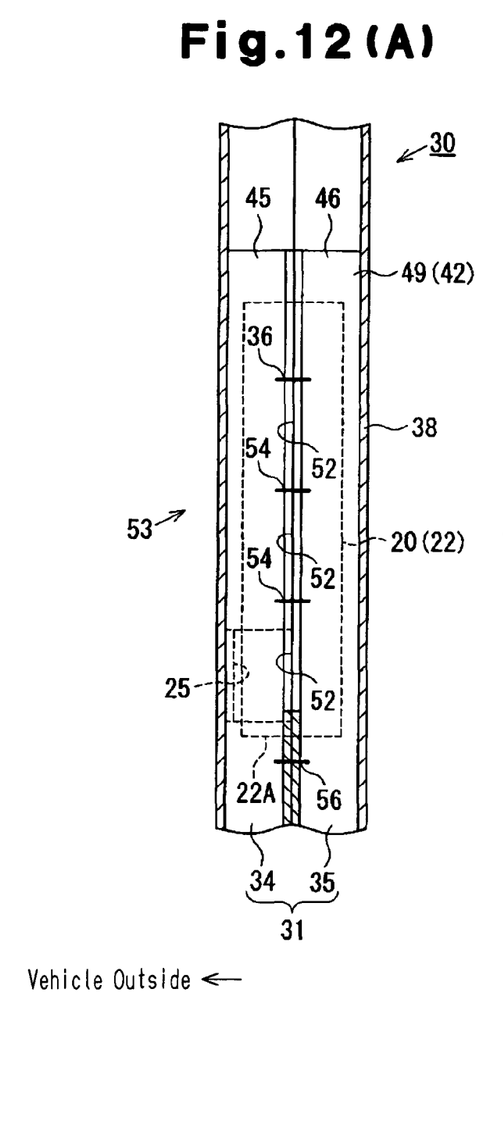
FIG. 12(A) is a partial cross-sectional view taken along line 12-12 of FIG. 5, illustrating gas supply passages when closed by a valve.
Figure 12B:
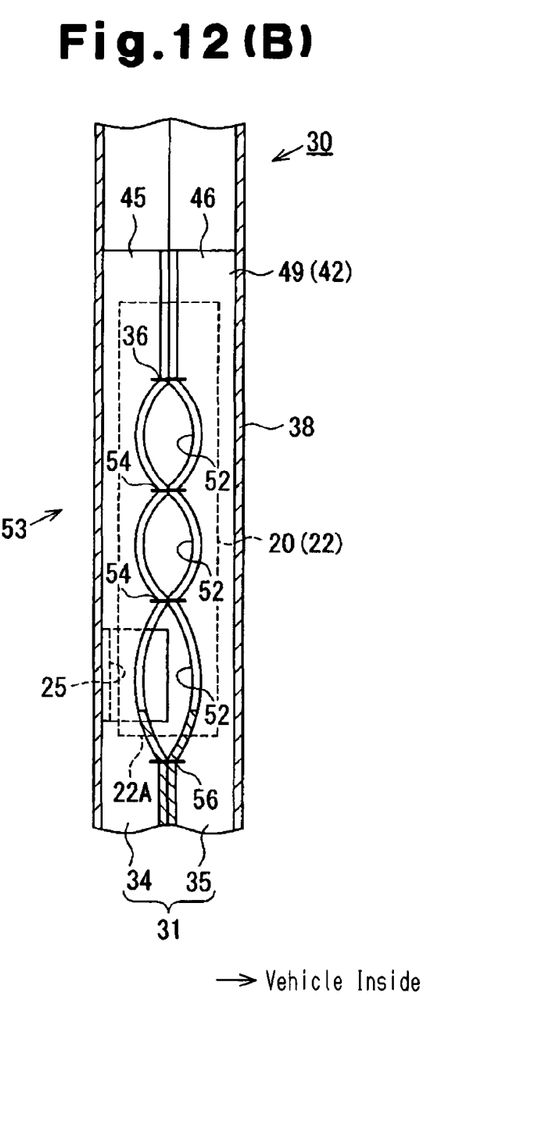
FIG. 12(B) is a partial cross-sectional view illustrating a state where gas supply passages are open from the state of FIG. 12(A).

Between a pair of the third and fourth fabric portions 45, 46, which forms the insertion portion 49, gas supply passages 52 are provided at a position forward of the inflator accommodating portion 51 (see FIGS. 12(A), 12(B)). The supply passages 52 extend forward from the inflator accommodating portion 51 and are open at the front end of the insertion portion 49. The gas supply passages 52 connect the inflator accommodating portion 51 with the outside in front of the insertion portion 49. At the exterior forward of the insertion portion 49, the first inflation section 31, which serves as a protecting portion mainly corresponding to the thorax Pt of the occupant P, is located.

A valve 53 is provided in the insertion portion 49. The valve 53 limits the direction of flow of inflation gas G in the gas supply passages 52 to a direction from the insertion portion 49 toward a receptacle portion 38 (forward direction in the present embodiment). The valve 53 includes a plurality of joining portions 54, which join the third and fourth fabric portions 45, 46 to each other, while defining the multiple gas supply passages 52. In the present embodiment, the joining portions 54 are spaced in the up-down direction and extend in the front-rear direction. The joining portions 54 and the front portions of the third and fourth fabric portions 45, 46 (portions above and below the joining portions 54) form the valve 53. The limitation on the flowing direction of the inflation gas G by the valve 53 will be discussed below.

(ii) Configuration of First Inflation Section 31

The first inflation section 31 is formed by a single fabric sheet 32 made of the same material as that of the second inflation section 42. The fabric sheet 32 is folded in half in the widthwise direction of the vehicle along a folding line 33 defined in a center portion. The folded two portions (hereinafter, referred to as first and second fabric portions 34, 35) are coupled to each other by a peripheral joining portion 36 provided at a peripheral portion except for the lower portions of the first and second fabric portions 34, 35. In the first inflation section 31, a portion that is above the lower edges 37 and includes the folding line 33 forms the receptacle portion 38.

Unlike the second inflation section 42, the first and second fabric portions 34, 35 are not turned inside out. In FIGS. 7 and 8, the peripheral joining portion 36 indicated by a thick broken line in a part where the first fabric portion 34, which is located on the outer side in the vehicle, is not cut away, and is indicated by a line with dashes that alternate between one long and two short dashes in a part where the outer side first fabric portion 34 is cut away and the second fabric portion 35, which is located on the inner side in the vehicle, is exposed.

(iii) Combined Configuration of First and Second Inflation Sections 31, 42

The insertion portion 49 of the second inflation section 42 is arranged in the receptacle portion 38 with the folding line 44 matched with the folding line 33 of the first inflation section 31. The arrangement causes the receptacle portion 38 to wrap around of the insertion portion 49.

The insertion portion 49 and the receptacle portion 38 are joined to each other by the endless inner joining portions 55 provided in the vicinity of the folding lines 44, 33. The insertion portion 49 and the receptacle portion 38 are also joined to each other by the partition joining portions 56, which extend substantially in the front-rear direction and along the lower edges 37 of the receptacle portion 38. Part of the partition joining portions 56 does not contribute to the joining of the insertion portion 49 and the receptacle portion 38, but only joins the lower edges of the first and second fabric portions 34, 35 of the first inflation section 31 to each other. The partition joining portions 56 divide each of the internal space of the first inflation section 31 and the internal space of the second inflation section 42 into upper and lower parts. That is, if the insertion portion 49 is simply inserted into the receptacle portion 38, the internal space of the first inflation section 31 and the internal space of the second inflation section 42 communicate with each other. By providing the partition joining portions 56, the internal space of each of the first and second inflation sections 31, 42 is divided into upper and lower parts. Further, in the present embodiment, the insertion portion 49 and the receptacle portion 38 are joined to each other at parts of the peripheral joining portions 36 (parts indicated by reference numeral 36A) of the first inflation section 31. In this manner, the first inflation section 31 and the second inflation section 42 are joined to each other by the part 36A of the peripheral joining portions 36, the inner joining portions 55, and a part of the partition joining portions 56.

A rear end 56R of each partition joining portion 56 is located at a position spaced forward from the lower edge of the inner joining portions 55. The insertion portion 49 and the receptacle portion 38 located outside of the insertion portion 49 are overlapped on each other. Parts that are between the insertion portion 49 and the receptacle portion 38 and is held between the inner joining portions 55 and the rear ends 56R of the partition joining portions 56 form two gas discharge passages 57. The gas discharge passages 57 are passages for discharging the inflation gas G in the first inflation section 31 to the outside. Parts in which the gas discharge passages 57 are formed are two portions: the space between the first and third fabric portions 34, 45 located on the outer side of the vehicle; and the space between the second and fourth fabric portions 35, 46 located on the inner side of the vehicle. The gas discharge passages 57 correspond to the vent hole disclosed in the prior art publications.

The above described inflator assembly 20 is arranged in the inflator accommodating portion 51 of the insertion portion 49 so as to be inclined and extend substantially in the up-down direction. In the insertion portion 49 and the receptacle portion 38, the bolts 26 fixed to the retainer 22 are passed through the fourth and second fabric portions 46, located on the inner side of the vehicle.

The airbag module AM is formed into a compact accommodation configuration shown in FIG. 9 by sequentially folding the spread airbag 30 (see FIG. 5) from the front side in the deployment direction toward the rear side. The airbag module AM is folded in this manner in order that it can be readily stored in a storage portion 15 having a limited size in the seat back 14 (see FIGS. 1 and 2).

In the airbag module AM formed into the above accommodation configuration, the bolts 26 that are passed through the insertion portion 49 and the receptacle portion 38 are received by the seat frame 16 in the seat back 14. The airbag module AM is fixed to the seat frame 16 by fastening nuts 17 to the bolts 26.

As shown in FIG. 1, the side airbag apparatus includes an impact sensor 61 and a controller 62 in addition to the above described airbag module AM. The impact sensor 61 is configured by an acceleration sensor, and is provided in the body side portion 11 of the vehicle 10 (see FIGS. 2 and 3). The impact sensor 61 detects an impact applied to the body side portion 11 from the exterior. The controller 62 controls the operation of the inflator 21 based on a detection signal from the impact sensor 61.

The operation of the above described side airbag apparatus will now be described.

When an impact of which the magnitude is greater than or equal to a predetermined value is applied to the body side portion 11, the impact is detected by the impact sensor 61 of the side airbag apparatus. Based on the detection signal, the controller 62 outputs an actuation signal for actuating the inflator 21 to the inflator 21. In response to the actuation signal, the gas generating agent in the inflator 21 generates high-temperature and high-pressure inflation gas G. As shown in FIG. 9, the inflation gas G is discharged in all the directions (radial directions) perpendicular to the axis L1 of the inflator 21 from the gas ports 24 of the gas nozzle 23.

The cylindrical retainer 22 covers the outer surface of the inflator 21. The opening 25 of the retainer 22 allows the inflation gas G to flow through the gas ports 24, and the parts of the retainer 22 except for the opening 25 in the circumferential direction block the flow of the inflation gas G. Therefore, the direction of the flow of the inflation gas G (flowing out direction) is determined in accordance with the position of the opening 25 in the retainer 22.

In the present embodiment, the opening 25 is located in a front part of the retainer 22, and most of the inflation gas G discharged forward flows toward the first inflation section 31 through the opening 25. Also, most of the inflation gas G that is discharged in directions other than the forward direction hits part of the retainer 22 other than the opening 25, and the direction of the flow is changed to two directions along the axis L1 of the inflator 21. However, a portion of the inflator 21 above the gas nozzle 23 has a diameter greater than that of the gas nozzle 23. Therefore, the space between the outer circumferential surface of the inflator 21 and the inner circumferential surface of the retainer 22 is smaller than the space between the outer circumferential surface of the gas nozzle 23 and the inner circumferential surface of the retainer 22. Thus, the inflation gas G, of which the direction of flow has been changed, is unlikely to flow upward, but is likely to flow downward. Thus, most of the inflation gas G that has hit the retainer 22 and changed its direction of flow passes through the open end 22A of the retainer 22 and flows downward (see FIG. 8). Since the opening 25 is provided only in a part of the circumference of the retainer 22, the amount of the inflation gas G that flows downward is greater than the amount of the inflation gas G that flows forward. In this manner, the amount of the inflation gas G supplied to the second inflation section 42 is greater than the amount of the inflation gas G supplied to the first inflation section 31.

As shown in FIGS. 1 and 3, the supply of the inflation gas G causes the first inflation section 31 and the second inflation section 42 to start inflating and then to be deployed while being unfolded. The airbag 30 is inflated and deployed in the narrow space SP between the body side portion 11 and the seat 12 with the inflator accommodating portion 51 and a portion in the vicinity of the inflator accommodating portion 51 remaining in the storage portion 15. More specifically, the first inflation section 31 is inflated and deployed between the body side portion 11 and the thorax Pt of the occupant P seated on the seat 12, whereas the second inflation section 42 is inflated and deployed between the body side portion 11 and the lumbar region Pp of the occupant P. At this time, the first inflation section 31 receives a smaller amount of the inflation gas G than the second inflation section 42. Therefore, at an early stage of inflation and deployment of the airbag 30, the first inflation section 31 is inflated and deployed by an internal pressure lower than that of the second inflation section 42.

When the airbag 30 is not restraining the occupant P, the internal pressure in the inflation sections 31, 42 increases as the supply of the inflation gas G proceeds. In contrast, in a restraining state where the airbag 30 restrains the occupant P, the inflation sections 31, 42 receive pressing force F from the occupant P (see FIG. 11), so that the internal pressure of the inflation sections 31, 42 becomes higher than that in the non-restraining state.

In the above described airbag 30, the insertion portion 49 of the second inflation section 42 is located in the receptacle portion 38 of the first inflation section 31. Between the insertion portion 49 and the receptacle portion 38 outside the insertion portion 49, the gas discharge passages 57 are formed on an outer side and an inner side in the vehicle. The gas discharge passages 57 open and close in accordance with whether the first inflation section 31 is restraining the occupant P.

<When First Inflation Section 31 is not Restraining Occupant P>

In this state, the first inflation section 31 is not receiving the pressing force F discussed below (see FIG. 11) from the occupant P, and the internal pressure of the inflation sections 31, 42 has a value that corresponds to the amount of the inflation gas G supplied by the inflator 21. At this time, the valve 53 provided at the insertion portion 49 opens, so that the inflation gas G in the second inflation section 42 is allowed to flow into the first inflation section 31. That is, as shown in FIG. 12(B), the third and fourth fabric portions 45, 46, which are stacked on each other in the insertion portion 49, are pushed away from each other by the inflation gas G ejected from the inflator 21. This widens the space between the third and fourth fabric portions 45, 46, thereby opening the gas supply passages 52. Accordingly, the inflation gas G from the inflator 21 flows into the first inflation section 31 through the gas supply passages 52. Particularly, in the present embodiment, the inflator assembly 20 is located in the insertion portion 49. Thus, compared to the case where the inflator assembly 20 is located elsewhere, the inflation gas G starts being guided to the first inflation section 31 through the gas supply passages 52 at an earlier stage after the start of the gas discharge. The first inflation section 31 is therefore inflated at an early stage.

Also, as shown in FIG. 10, when the supplied inflation gas G causes the outer side third fabric portion 45 of the insertion portion 49 to closely contact the outer side first fabric portion 34 of the receptacle portion 38, the outer side gas discharge passage 57 is closed. Also, when the supplied inflation gas G causes the inner side fourth fabric portion 46 of the insertion portion 49 to closely contact the inner side second fabric portion 35 of the receptacle portion 38, the inner side gas discharge passage 57 is closed. Accordingly, the flow of inflation gas G through the gas discharge passages 57 is restricted. That is, at least the inflation gas G in the first inflation section 31 is restricted from being discharged to the outside of the airbag 30 through the gas discharge passages 57. As a result, if the amount of the inflation gas G supplied by the inflator 21 is the same as the case of the prior art airbag apparatuses, the configuration of the present embodiment allows at least the first inflation section 31 to be inflated at an earlier stage than the case of the prior art airbag apparatuses. The prior art airbag apparatuses are of a type in which inflation gas G starts being discharged to the outside before the occupant P is restrained as described in BACKGROUND OF THE INVENTION section.

<When First Inflation Section 31 is Restraining Occupant P>

When the occupant P is not being restrained, the internal pressure of the first inflation section 31 is increased solely by the inflation gas G supplied through the insertion portion 49. Thus, the internal pressure of the first inflation section 31 is increased to a level no higher than the internal pressure of the insertion portion 49.

However, when the first inflation section 31 is restraining the occupant P, the first inflation section 31 receives the pressing force F from the occupant P as shown in FIG. 11. Thus, the internal pressure of the first inflation section 31 is higher than in the non-restraining state. When the first inflation section 31 is restraining the occupant P, a relatively long period has elapsed since the start of discharge of the inflation gas G, and the supply of the inflation gas G from the inflator 21 to the insertion portion 49 has started decreasing or stopped. In this case, since it is difficult to increase or maintain the internal pressure of the insertion portion 49, the internal pressure of the insertion portion 49 decreases.

Therefore, when the first inflation section 31 is restraining the occupant P, the internal pressure of the insertion portion 49 is lower than the internal pressure of the first inflation section 31. Then, parts of the third and fourth fabric portions 45, 46 of the insertion portion 49 are pushed away from the first and second fabric portions 34, 35. When a part of the outer side third fabric portion 45 in the insertion portion 49 separates from the outer side first fabric portion 34 of the receptacle portion 38, the outer side gas discharge passage 57 is opened. This allows the inflation gas G to flow through the gas discharge passage 57. Also, when a part of the inner side fourth fabric portion 46 in the insertion portion 49 separates from the inner side second fabric portion 35 of the receptacle portion 38, the inner side gas discharge passage 57 is opened. This allows the inflation gas G to flow through the gas discharge passage 57. As a result, at least the inflation gas G in the first inflation section 31 is discharged to the outside of the airbag 30 through the outer side and inner side gas discharge passages 57. This lowers the internal pressure of the first inflation section 31. In this manner, the internal pressure of the first inflation section 31 is prevented from being excessively increased due to the restraint of the thorax Pt of the occupant P.

At this time, the valve 53 provided in the insertion portion 49 is closed as shown in FIG. 12(A), so that the inflation gas G that has flowed into the first inflation section 31 is restricted from flowing out to the second inflation section 42. That is, as described above, since the internal pressure of the first inflation section 31 becomes higher than the non-restraining state and the pressure of the insertion portion 49 is lowered, the third and fourth fabric portions 45, 46 pushed laterally toward each other. The space between the third and fourth fabric portions 45, 46 diminishes, and then the third and fourth fabric portions 45, 46 closely contact each other, which closes the gas supply passages 52. Accordingly, the inflation gas G in the first inflation section 31 is restricted from flowing out to the insertion portion 49 (the second inflation section 42) through the gas supply passages 52. Therefore, the excessive amount of the inflation gas G in the first inflation section 31 is reliably discharged to the outside of the airbag 30 through the gas discharge passages 57, without flowing back to the second inflation section 42.

Particularly, when the third and fourth fabric portions 45, 46 are pushed laterally away from each other, the joining portions 54 of the valve 53 restrict the space between the third and fourth fabric portions 45, 46 (the inflated widths of the third and fourth fabric portions 45, 46), while ensuring sufficient flow of the inflation gas G through the supply passages 52. For example, if the inflator 21 stops ejecting inflation gas G immediately before the first inflation section 31 starts restraining the occupant P or during an early stage of restraint, the third and fourth fabric portions 45, 46 are more likely to closely contact each other than the case where no joining portions 54 are provided. Thus, the gas supply passages 52 are likely to be closed. Therefore, when the first inflation section 31 is restraining the thorax Pt of the occupant P, the gas supply passages 52 are closed at an early stage.

The present embodiment described above has the following advantages.

(1) The insertion portion 49 of the second inflation section 42 is located in the receptacle portion 38 of the first inflation section 31. The gas discharge passages 57 for discharging the inflation gas G in the first inflation section 31 to the outside of the airbag 30 are formed between the overlapped insertion portion 49 and receptacle portion 38. Also, the first inflation section 31 and the second inflation section 42 are joined to each other by the joining portions (the parts 36A of the peripheral joining portions 36, the inner joining portions 55, and parts of the partition joining portions 56) as illustrated in FIG. 7.

Therefore, when the first inflation section 31 is not restraining the occupant P, the inflation gas G in each inflation section 31, 42 causes the insertion portion 49 to closely contact the receptacle portion 38. Accordingly, the gas discharge passages 57 are closed, so that the first inflation section 31 is inflated and deployed at an early stage (see FIG. 10). When the first inflation section 31 is restraining the occupant P, a part of the insertion portion 49 is separated from the receptacle portion 38 by using the increase in the internal pressure of the first inflation section 31 due to the restraint. This opens the outer and inner gas discharge passages 57, so that the internal pressure of the first inflation section 31 is prevented from being excessively increased (see FIG. 11).

(2) The inflator assembly 20 is arranged in the insertion portion 49. The insertion portion 49 has the gas supply passages 52 (see FIG. 8), which connect the inside and the outside of the insertion portion 49 to each other, and guides the inflation gas G from the inflator 21 into the first inflation section 31. Therefore, from an early stage after the start of the discharge of the inflation gas G, the inflation gas G is supplied not only to the second inflation section 42 but also to the first inflation section 31, so that the inflation sections 31, 42 are inflated at an early stage.

(3) The valve 53 is provided in the insertion portion 49 (see FIG. 8), and the valve 53 limits the direction of flow of the inflation gas G in the gas supply passages 52 to one direction from the insertion portion 49 toward the receptacle portion 38. Therefore, when the first inflation section 31 is restraining the occupant P, the inflation gas G in the first inflation section 31 is reliably discharged to the outside of the airbag 30 through the gas discharge passages 57, without flowing back to the second inflation section 42.

(4) A pair of the third and fourth fabric portions 45, 46 are stacked on and joined to each other to form the insertion portion 49, and the gas supply passages 52 are formed between the third and fourth fabric portions 45, 46. When the first inflation section 31 is not restraining the occupant P, the inflation gas G from the inflator 21 opens the valve 53. This separates the third and fourth fabric portions 45, 46 from each other, thereby opening the gas supply passages 52 (see FIG. 12(B)). Accordingly, the inflation gas G from the inflator 21 is allowed to flow into the first inflation section 31 through the gas supply passages 52.

When the first inflation section 31 is restraining the occupant P, the valve 53 is opened by using the increase in the internal pressure of the first inflation section 31 due to the restraint. This causes the third and fourth fabric portions 45, 46 to closely contact each other, thereby closing the gas supply passages 52 (see FIG. 12(A)). Accordingly, the inflation gas G in the first inflation section 31 is restricted from flowing out to the insertion portion 49 (the second inflation section 42) through the gas supply passages 52.

(5) The gas supply passages 52 are formed as part of the valve 53, and the joining portions 54 for joining the third and fourth fabric portions 45, 46 are provided (see FIGS. 12(A) and 12(B)). Thus, compared to the case where no joining portions 54 are provided, the third and fourth fabric portions 45, 46 more easily closely contact each other, and the gas supply passages 52 are thus easier to be closed. Therefore, when the first inflation section 31 is restraining the occupant P, the gas supply passages 52 are closed at an early stage.

(6) The first inflation section 31 of the airbag 30 is inflated and deployed by the inflation gas G between the thorax Pt of the occupant P seated in the seat 12 and the body side portion 11 (see FIGS. 11 and 13). Therefore, by discharging the inflation gas G in the first inflation section 31 to the outside of the airbag 30 through the gas discharge passages 57, the internal pressure of the first inflation section 31 is prevented from being excessively increased. Thus, a part of the side of the occupant P that has a particularly low impact resistance, or the thorax Pt, is gently protected.

The present invention may be embodied in the following forms.

<Modifications to Inflator Assembly 20>

The present invention may be applied to a side airbag apparatus in which a retainer 22 is fixed to a vehicle 10 (a seat frame 16) with securing members different from the bolts 26.

The retainer 22 may have a closed upper end and an open lower end, or may have closed upper and lower ends.

The inflator 21 may be directly attached to the seat frame 16 without using the retainer 22.

The inflator 21 (the inflator assembly 20) may be located in a position other than the insertion portion 49 in the second inflation section 42. For example, the inflator 21 (the inflator assembly 20) may be located in the first inflation section 31 or in a position across both of the inflation sections 31 and 42.

<Modifications to Airbag 30>

The valve 53 may have a structure different from that described in the above embodiment. Any type of valve may be used as the valve 53 as long as it limits the direction of flow of the inflation gas G in the gas supply passages 52 to one direction from the insertion portion 49 toward the receptacle portion 38.

The number, positions, and extending direction of the joining portions 54 in the valve 53 may be changed as necessary.

The valve 53 may be omitted.

The division of the internal space of the airbag 30 (the first inflation section 31 and the second inflation section 42) into the upper and lower parts and the joint of the first inflation section 31 and the second inflation section 42 may be achieved by different joining portions.

In addition to the first inflation section 31 and the second inflation section 42, the airbag 30 may have other inflation sections. In this case, an additional inflation section may be formed as a second inflation section 42. That is, two second inflation sections 42 may be connected to a single first inflation section 31. Also, a plurality of inflation sections may be arranged to form a row. The front one of the inflation section in the row is used as a first inflation section 31, and the rear one of the inflation section is used as a second inflation section 42. In this case, the middle inflation sections except for the ends of the row (the lead and the rearmost) each function as both of a first inflation section 31 and a second inflation section 42.

Only one gas discharge passage 57 may be provided between the receptacle portion 38 and the insertion portion 49. Alternatively, three or more gas discharge passages 57 may be provided.

The gas supply passages 52 may be modified to open at positions different from the front end of the insertion portion 49, for example, at the upper end of the insertion portion 49.

The gas discharge passages 57 may be configured differently from those in the above embodiment. For example, the outer side third fabric portion 45 in the insertion portion 49 may be sewn to the outer side first fabric portion 34 of the receptacle portion 38, so that the outlet of the outer side gas discharge passage 57 is always closed. Likewise, the inner side fourth fabric portion 46 in the insertion portion 49 may be sewn to the inner side second fabric portion 35 of the receptacle portion 38, so that the outlet of the inner side gas discharge passage 57 is always closed. In the outer side first fabric portion 34, a hole is provided in an area that closely contacts or separates from the outer side third fabric portion 45. The hole is used as a new outlet of the outer side gas discharge passage 57. Likewise, in the inner side second fabric portion 35, a hole is provided in an area that closely contacts or separates from the inner side fourth fabric portion 46. The hole is used as a new outlet of the inner side gas discharge passage 57.

In this modification, the third and fourth fabric portions 45, 46 closely contact the first and second fabric portions 34, 35, thereby closing the holes (the gas discharge passages 57). This restricts the inflation gas G from being discharged to the outside of the airbag 30 through the gas discharge passages 57. In contrast, the third and fourth fabric portions 45, 46 separate from the first and second fabric portions 34, 35, thereby opening the holes (the gas discharge passages 57). This allows the inflation gas g in the airbag 30 to be discharge to the outside.

<Other Modifications>

The storage portion 15 may be provided in the body side portion 11, instead of in the seat back 14. In this case also, the storage portion 15 is located at such a position that the airbag 30 is deployed in the vicinity of a side of the occupant P seated in the seat 12.

The present invention may be applied to a side airbag apparatus that protects parts of an occupant P other than the thorax Pt and the lumbar region Pp. For example, the first inflation section 31 of the airbag 30 may be an inflation section that protects a part of the occupant P other than the thorax Pt. Also, the second inflation section 42 may be an inflation section that protects a part of the occupant P other than the lumbar region Pp.

The present invention may be applied to an airbag apparatus of a different type from the above described side airbag apparatus. For example, the present invention may be applied to a curtain airbag apparatus for protecting the head of an occupant when an impact is applied from a side.

Therefore, the present examples and embodiments are to be considered as illustrative and not restrictive and the invention is not to be limited to the details given herein, but may be modified within the scope and equivalence of the appended claims.

What is claimed is:

1. An airbag apparatus comprising an inflator that discharges inflation gas in response to impact applied to a vehicle and an airbag that is inflated by the inflation gas supplied by the inflator to restrain an occupant, thereby protecting the occupant, wherein the airbag includes a first inflation section and a second inflation section that are each formed like a bag and inflated by the inflation gas from the inflator, wherein the first inflation section has a receptacle portion, and the second inflation section has an insertion portion that is arranged in the receptacle portion in an overlapping manner, and wherein the first inflation section and the second inflation section are connected to each other in a state where a gas discharge passage is formed between the overlapping insertion portion and receptacle portion, the gas discharge passage being used for discharging the inflation gas in the first inflation section to the outside of the airbag, and a part of the insertion portion separates from the receptacle portion so that the gas discharge passage is opened.

2. The airbag apparatus according to claim 1, wherein the inflator is located in the insertion portion, and wherein a gas supply passage is provided in the insertion portion, the gas supply passage connecting the interior of the insertion portion with the interior of the first inflation section, and guides the inflation gas from the inflator to the interior of the first inflation section.

3. The airbag apparatus according to claim 2, wherein a valve is provided in the insertion portion, the valve limiting the direction of flow of the inflation gas in the gas supply passage to one direction from the insertion portion toward the receptacle portion.

4. The airbag apparatus according to claim 3, wherein the insertion portion includes a pair of stacked fabric portions, the gas supply passage formed between the fabric portions, and wherein, when the first inflation section is not restraining the occupant, the valve is opened by supply of the inflation gas from the inflator and thus separates the fabric portions from each other to open the gas supply passage, and wherein, when the first inflation section is restraining the occupant, the valve is closed by increase in the internal pressure of the first inflation section due to the restraint, thereby causing the fabric portions to closely contact each other so that the gas supply passage is closed.

5. The airbag apparatus according to claim 4, wherein the valve divides the gas supply passage into a plurality of passages and includes a joining portion that joins the fabric portions to each other.

6. The airbag apparatus according to claim 1, wherein the first inflation section is inflated between the thorax of the occupant seated in a vehicle seat and a body side portion of the vehicle.

7. The airbag apparatus according to claim 6, wherein the second inflation section is inflated between the lumbar region of the occupant and the body side portion of the vehicle.

* * * * *